US009953528B2

(12) United States Patent
Winckler

(10) Patent No.: US 9,953,528 B2
(45) Date of Patent: Apr. 24, 2018

(54) VEHICLE, SYSTEM AND METHOD FOR FORWARDING EVENTS

(71) Applicant: Bayerische Motoren Werke Aktiengesellschaft, Munich (DE)

(72) Inventor: Andreas Winckler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/049,731

(22) Filed: Feb. 22, 2016

(65) Prior Publication Data

US 2016/0245660 A1 Aug. 25, 2016

(30) Foreign Application Priority Data

Feb. 23, 2015 (DE) .................. 10 2015 203 193

(51) Int. Cl.
*G08G 1/09* (2006.01)
*B60W 30/00* (2006.01)
(Continued)

(52) U.S. Cl.
CPC ............ *G08G 1/093* (2013.01); *B60W 30/00* (2013.01); *B60W 30/143* (2013.01);
(Continued)

(58) Field of Classification Search
CPC .......... G08G 1/09; G08G 1/091; G08G 1/093; G08G 1/095; G08G 1/096716;
(Continued)

(56) References Cited

U.S. PATENT DOCUMENTS 6,055,570 A * 4/2000 Nielsen ............ G06F 17/30899
707/E17.119
6,741,926 B1 * 5/2004 Zhao .................. G01C 21/3492
701/420
(Continued)

FOREIGN PATENT DOCUMENTS

DE 10 2010 027 899 A1 10/2011
DE 10 2012 006 706 A1 10/2012
(Continued)

OTHER PUBLICATIONS

German Search Report issued in counterpart German Application No. 10 2015 203 193.4 dated Nov. 27, 2015 with partial English-language translation (sixteen (16) pages).

*Primary Examiner* — Behrang Badii
*Assistant Examiner* — David A Testardi
(74) *Attorney, Agent, or Firm* — Crowell & Moring LLP

(57) ABSTRACT

A vehicle includes a communication unit for the communication with an event management server, a navigation system for the output of at least one route, and a planning system. The planning system is configured to: a) retrieve a list, for a plurality of devices, particularly traffic light systems and/or signal groups of traffic light systems, the list including one identification respectively of the respective device and at least one position indication respectively of the respective device, b) compare the list with the route, in order to select at least one device from the list, c) for the subscription of events with respect to the selected device, send at least one subscription message to the event management server, the subscription message including the identifications of the selected devices.

14 Claims, 3 Drawing Sheets

(51) Int. Cl.
*B60W 30/14* (2006.01)
*G08G 1/0967* (2006.01)
*G08G 1/095* (2006.01)
*G01C 21/36* (2006.01)
*B60W 50/00* (2006.01)

(52) U.S. Cl.
CPC ..... *B60W 50/0097* (2013.01); *G01C 21/3691* (2013.01); *G08G 1/095* (2013.01); *G08G 1/096741* (2013.01); *G08G 1/096775* (2013.01); *G08G 1/096783* (2013.01); *B60W 2550/40* (2013.01); *B60W 2550/402* (2013.01)

(58) Field of Classification Search
CPC ....... G08G 1/096741; G08G 1/096775; G08G 1/096783; G08G 1/0141; G08G 1/096733; B60W 30/143; B60W 50/0097
See application file for complete search history.

(56) References Cited

U.S. PATENT DOCUMENTS

| | | | | | |
|---|---|---|---|---|---|
| 6,973,384 | B2 * | 12/2005 | Zhao | ............. | G01C 21/3492 342/357.29 |
| 8,478,500 | B1 * | 7/2013 | Vahidi | ............. | B60T 7/18 340/932 |
| 2003/0100326 | A1 * | 5/2003 | Grube | ............. | H04W 84/08 455/515 |
| 2004/0158366 | A1 * | 8/2004 | Dieterle | ............. | B60K 31/0008 701/23 |
| 2005/0075095 | A1 * | 4/2005 | Dillon | ............. | G07C 5/008 455/412.2 |
| 2005/0096095 | A1 * | 5/2005 | Benco | ............. | G06Q 10/109 455/567 |
| 2006/0009188 | A1 * | 1/2006 | Kubota | ............. | G08G 1/096725 455/344 |
| 2008/0081641 | A1 * | 4/2008 | Smith | ............. | G08G 1/096716 455/456.3 |
| 2008/0096531 | A1 * | 4/2008 | McQuaide | ............. | H04L 12/58 455/412.1 |
| 2008/0183485 | A1 | 7/2008 | Drabble et al. | | |
| 2008/0209441 | A1 * | 8/2008 | Septon | ............. | G06Q 30/02 719/318 |
| 2008/0294771 | A1 * | 11/2008 | Hermes | ............. | G05B 23/0267 709/224 |
| 2010/0036941 | A1 * | 2/2010 | Rahman | ............. | H04L 12/2827 709/224 |
| 2010/0121948 | A1 * | 5/2010 | Procopio | ............. | H04L 67/28 709/224 |
| 2011/0034183 | A1 * | 2/2011 | Haag | ............. | G06Q 50/26 455/456.3 |
| 2011/0095906 | A1 * | 4/2011 | Stahlin | ............. | G08G 1/095 340/905 |
| 2012/0209487 | A1 * | 8/2012 | Busch | ............. | G08G 1/0116 701/70 |
| 2012/0271544 | A1 * | 10/2012 | Hein | ............. | G01C 21/3407 701/423 |
| 2013/0073605 | A1 * | 3/2013 | Fosburgh | ............. | G06F 11/3013 709/202 |
| 2013/0184985 | A1 * | 7/2013 | Bollars | ............. | G01C 21/36 701/410 |
| 2014/0074403 | A1 * | 3/2014 | Shin | ............. | G08G 1/096816 701/537 |
| 2014/0136090 | A1 * | 5/2014 | Yun | ............. | G08G 1/096716 701/119 |
| 2015/0057923 | A1 * | 2/2015 | Han | ............. | G01C 21/3492 701/465 |
| 2015/0254270 | A1 * | 9/2015 | Bollars | ............. | G08G 1/096716 707/610 |
| 2016/0142860 | A1 * | 5/2016 | Kim | ............. | H04W 60/00 455/435.1 |

FOREIGN PATENT DOCUMENTS

| | | | |
|---|---|---|---|
| DE | 10 2012 216 788 A1 | | 5/2014 |
| JP | 2007140740 A | * | 6/2007 |
| JP | 2008269481 A | * | 11/2008 |
| JP | 2011164764 A | * | 8/2011 |
| JP | 2011170676 A | * | 9/2011 |
| JP | 2012043260 A | * | 3/2012 |
| JP | 2013213780 A | * | 10/2013 |
| WO | WO 2014/025925 A1 | | 2/2014 |

* cited by examiner

VEHICLE, SYSTEM AND METHOD FOR FORWARDING EVENTS

CROSS REFERENCE TO RELATED APPLICATIONS

This application claims priority under 35 U.S.C. § 119 from German Patent Application No. 10 2015 203 193.4, filed Feb. 23, 2015, the entire disclosure of which is herein expressly incorporated by reference.

BACKGROUND AND SUMMARY OF THE INVENTION

The invention relates to a vehicle, a system and a method for forwarding events.

Modern vehicles are generally equipped with communication units, so that they can retrieve services during a drive. Location-based services are playing an increasingly important role in this context. The communication can take place by way of cellular networks (for example, UMTS or LTE). However, the rising utilization of services increases the global data density, so that information will no longer arrive on time at the respective vehicle.

One use case, in which this is particularly problematic, is described in U.S. Patent Document US 2008/0183485 A1. The system explained there makes it possible for a vehicle to subscribe to defined geographical regions, so that events occurring there can be forwarded to the vehicle. Depending on the situation, an overloading of the network may easily take place here, so that the required information will not arrive at the vehicle at all or will arrive too late.

Based on U.S. Patent Document US 2008/0183485 A1, it is therefore an object of the present invention to provide a more efficient approach for the transmission of events to vehicles. The approach should, in particular, protect the existing bandwidths and ensure a transmission that is as timely as possible.

This object is achieved by a vehicle, a system as well as a method according to embodiments of the invention.

In particular, the object is achieved by a vehicle comprising
   a communication unit for the communication with an event management server,
   a navigation system for the output of at least one route,
   a planning system, which is designed for
   a) retrieving a list, for a plurality of devices, particularly traffic light systems and/or signal groups of traffic light systems, the list comprising one identification respectively of the respective device and at least one position indication respectively of the respective device;
   b) comparing the list with the route, in order to select at least one device from the list;
   c) for the subscription of events with respect to the selected device, sending at least one subscription message to the event management server, the subscription message comprising the identifications of the selected devices.

One aspect of the present invention therefore consists of the fact that information is not retrieved within the scope of a pull technique, as in the case of previous approaches, but information, particularly events, are provided by a push technique. This is particularly advantageous in connection with traffic light systems and/or signal groups of traffic light systems.

A further aspect of the present invention consists of concretely identifying individual devices when setting up the subscription. For this purpose, it is necessary to first receive a list of existing devices in connection with position indications. The position indications can be compared with a planned route. According to the invention, subscriptions should then only be made for those events of devices that are situated on the given route or an alternative route. In the end, a selection of the events therefore takes place at the device level, in which case, however, the selection of the relevant devices does not take place on the server side but on the client side, for example, by the vehicle. It is thereby ensured that no unnecessary information has to be communicated to the server. This also has certain advantages with respect to data protection.

It is an advantage of the present invention that only those events have to be forwarded in the form of event messages to the vehicle which were selected in a preceding step. The devices can be identified by an identification or labeling known to the server as well as to the client.

In an embodiment, the planning system retrieves a corresponding list of identifications from the event management server. This retrieval can take place by taking into account a position specification or location specification. Such a retrieval may, for example, contain the current actual position as well as a desired radius, such as 10 kilometers. The event management server will then determine the devices which are situated within the defined region, for example, a circular area, and will forward a corresponding list with identifications.

In a preferred embodiment, the navigation system can supply the list of devices. The navigation system may, for example, include a memory, which is designed for storing a plurality identifications and positions of devices. These identifications and positions can be used for supplying the list for the selection of the relevant devices to the planning system. When the navigation system defines the route, a corresponding selection may also already take place by the navigation system, so that the planning system will receive an already preselected list. It is contemplated to implement the planning system as part of the navigation system.

The planning system can be designed for:
   d) receiving an event message from an event management server;
   e) processing the event message and, based on the event message, predicting a future event, particularly a state of change which is assigned to one of the selected devices; and
   f) communicating the future event and, if applicable, a point in time of the occurrence of the future event to a driver assistance system.

An event message preferably relates to at least one event. A corresponding event may be the state of change of the device. The event may, for example, indicate that a signal transmitter, a signal group or a traffic light system has changed from a green phase to a red phase or from a red phase to a green phase. In an embodiment, the sending of an event message is triggered by a corresponding change of state. Furthermore, the event message may contain a future event, and may optionally contain the occurrence point in time or an estimation of the occurrence point in time of the future event. This additional information enables the vehicle to react to the future events. For example, a vehicle speed can be adapted, and/or a driver assistance system, such as a brake assistant, can be changed to a defined state, for example, a state with shorter monitoring cycles.

It is also contemplated to deactivate services on time which are offered, for example, only while the vehicle is stopped, based on information concerning the future event (the traffic light switches from red back to green). According to the invention, transitions of state of the vehicle can also be coupled to the current and/or future events. According to the invention it becomes possible, for example, to start the engine, in the case of an automatic start-stop system, already before the switching-over from a red phase to a green phase.

In an embodiment, the vehicle includes a driver assistance system. The driver assistance system can be a cruise control, which is designed for adapting a desired speed while taking into account the future event and/or the point in time of the occurrence of the future event. As an alternative or in addition, it is contemplated to indicate a corresponding desired speed so that it can be seen by the driver or to output it in another form.

The planning system can be designed for:
storing a client subscription list which indicates at least some of the subscribed devices and/or events;
receiving vehicle events, for example, with respect to a reached position and/or a new calculation a route; and
as a function of at least one vehicle event, sending a unselection message to the event management server in order to terminate a subscription of an event.

According to the invention, not only a subscribing of defined events can take place but also a terminating of this subscription. This operation is preferably triggered by the planning system of the vehicle, to which the required information is available. In order to permit an effective setting-up as well as unselecting/canceling/deactivating of a subscription, at least some of the subscriptions are stored in a client subscription list. Depending on defined vehicle events, the planning system can then unselect a defined subscription. The events may be arbitrary events. The vehicle events may, for example, be a function of where the vehicle is located at the moment. It is therefore contemplated that, after driving through a traffic light system, corresponding events will no longer be relevant to the vehicle. Likewise, the vehicle event may be a driver's maneuvering. The driver may, for example, change into a different direction, so that certain events of certain devices will no longer be relevant. Likewise, a recalculation of the route may take place on the part of the navigation system, which has the result that certain events of certain devices will no longer be relevant. The availability of the client subscription list has the result that the existing communication paths can be utilized extremely efficiently.

The initially mentioned object is further achieved by a system having an event management server. The event management server can be designed for:
a) storing a list of identifications which relate to devices;
b) receiving subscription messages from a plurality of clients, particularly from vehicles, an identification of a device and a sender address being assigned to the subscription messages;
c) selecting devices based on the subscription messages and storing an assignment between the selected device and the respective sender address, for example, in a server subscription list;
d) acquiring at least one event that relates to one of the devices;
e) based on the stored assignments, selecting at least one client for the at least one event; and
f) sending at least one event message to the selected client.

Advantages are obtained that are similar to those described above in connection with the vehicle.

The system may include one or more of the above-described vehicles in one of the described embodiments.

Furthermore, the system may include a plurality of traffic light systems, signal groups and/or signal transmitters. In a preferred embodiment, a control is assigned to at least one traffic light system with several signal groups and/or at least one signal group, the control being designed for, in the event of a current transition of state, determining a point in time of a future, particularly inverse transition of state, and communicating the current transition of state and the point in time of the future transition of state. This information can preferably be communicated to the event management server, which forwards this information in an embodiment to at least one vehicle. Corresponding controls frequently have a deterministic control algorithm, which makes it possible to predict or determine future changes of state. This information may be relevant to the vehicle in order to be able to react to the event in time. In this case, it is contemplated that future events are taken into account on the part of the planning system in the respective vehicle. As an alternative, the planning system can wait until the predicted event has occurred or is occurring according to the predefined time. In this respect, an environment can be provided inside the vehicle which can react to events quasi in real time. In a preferred embodiment, at least some of the vehicles have clocks, which are synchronized with a clock of the event management server.

The system may further include a history database. This history database can monitor and record past transitions of state of individual devices. For example, states and dwell times in defined states can be stored. According to the invention, this information can be used for predicting future dwell times and transitions of states. In this respect, the system according to the invention can also provide information for traffic light systems, signal groups and/or signal transmitters which follow no deterministic algorithm. Likewise, the described mechanism can be used for making reliable predictions in cases in which the corresponding devices do not provide this information. As described above, the predicted events and transition points in time can be forwarded in corresponding event messages to one or more vehicles.

The initially described object is further achieved by a method for forwarding events. According to the method, the events can be forwarded to a plurality of vehicles. The above-described selective forwarding of events takes place by means of the described event messages. The vehicle may be a vehicle like the one described above.

The method permits the implementation of the steps of:
a) receiving at least one subscription message from at least one vehicle, an identification of a device and a sender address being assigned to the subscription message;
b) based on the subscription messages, selecting a device from a list of devices;
c) storing an assignment of the vehicle to the selected device;
d) acquiring events which concern some of the devices from the list;
e) based on the stored assignment, forwarding an event, which concerns the selected device, to the assigned vehicle.

Advantages similar to those described above in connection with the devices (system and/or vehicle) are also achieved with respect to the method.

Furthermore, the method may comprise the step of:
f) based on the stored assignment, forwarding data concerning a point in time of the occurrence of a future event to the assigned vehicle.

The initially mentioned object is further achieved by a machine-readable memory with instructions for the implementation of the described method. These instructions are preferably implemented on an arithmetic unit, and the corresponding effects are essential for the invention.

Other objects, advantages and novel features of the present invention will become apparent from the following detailed description of one or more preferred embodiments when considered in conjunction with the accompanying drawings.

DETAILED DESCRIPTION OF THE DRAWINGS

In the following description, the same reference numbers are used for identical parts and parts with an identical effect.

Figure 1:
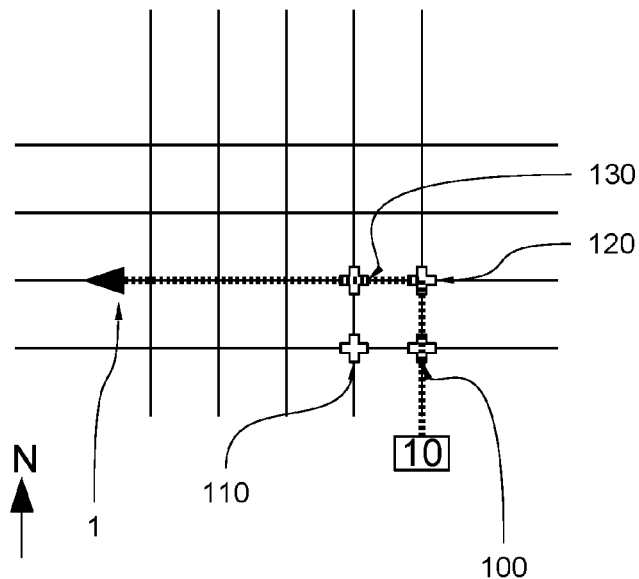
FIG. 1 is a schematic view of a road map with a plurality of traffic light systems.
Figure 6:
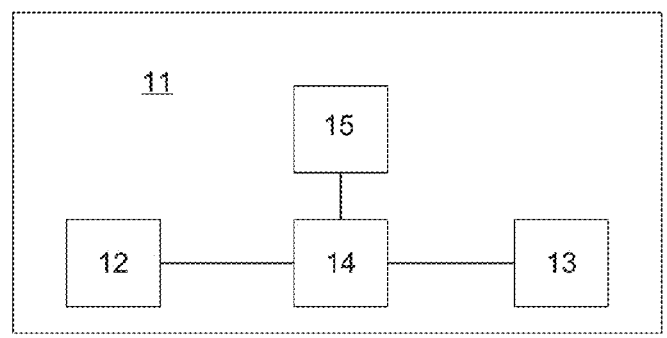
FIG. 6 is a view of individual components of an onboard power supply system of a vehicle.

FIG. 1 is a schematic view of a road map in a chessboard pattern. Traffic light systems are situated at some schematically outlined street intersections; specifically, a first traffic light system 100, a second traffic slight system 110, a third traffic light system 120 and a fourth traffic light system 130. Furthermore, a vehicle 10 is outlined, which is to travel along the roads. As illustrated in FIG. 6, the vehicle 10 includes an onboard power supply system 11 (i.e., a vehicle electrical system) and a navigation system 12. The navigation system 12 can be used for calculating a route 1. In FIG. 1, the route 1 is outlined as an example, in which case, the vehicle 10 is to first move in the northern direction and then turn off in the western direction and therefore will pass through a plurality of intersections. On this route 1, the vehicle 10 crosses the first traffic light system 100 and turns left at the third traffic light system 120. The fourth traffic light system 130 is then crossed. The second traffic light system 110 is not situated on route 1.

Figure 2:
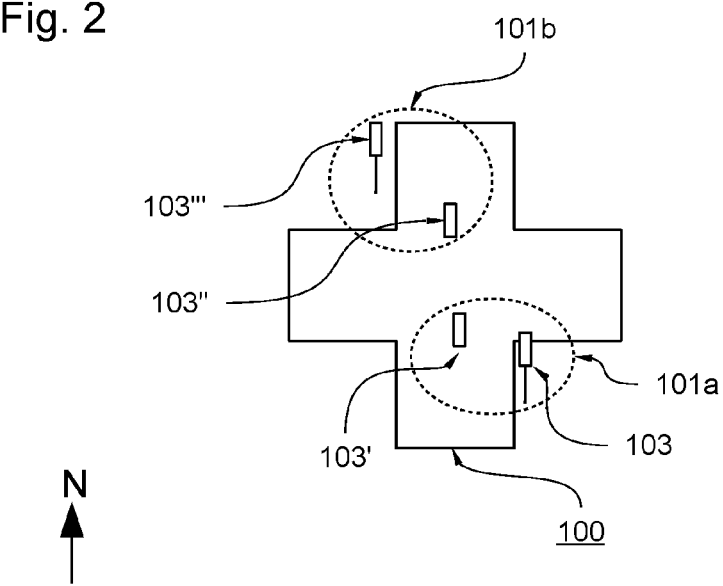
FIG. 2 is a schematic view of a detail of a traffic light system of FIG. 1.

As an example, FIG. 2 shows an embodiment of the first traffic light system 100. It is a schematic view of two signal groups 101a and 101b. The first signal group 101a exclusively comprises signal transmitters 103, 103', which are relevant to a vehicle 10 traveling toward the intersection from the southern direction. Correspondingly, the second signal group 101b only comprises signal transmitters 103", 103''', which are relevant to a vehicle 10 traveling toward the intersection from the northern direction. The respective signal groups 101a, 101b can also be controlled by a common control of the traffic light system 100. As an alternative, it is also contemplated to provide a separate control for each signal group 101a, 101b.

The traffic light systems 110, 120, 130 can be correspondingly equipped with signal groups 101a, 101b. Likewise, a traffic light system can include a single signal transmitter, such as the signal transmitter 103. A traffic light system 100, 110, 120, 130 can also include signal groups 101a, 101b, which have only one signal transmitter, such as the signal transmitter 103.

Figure 3:
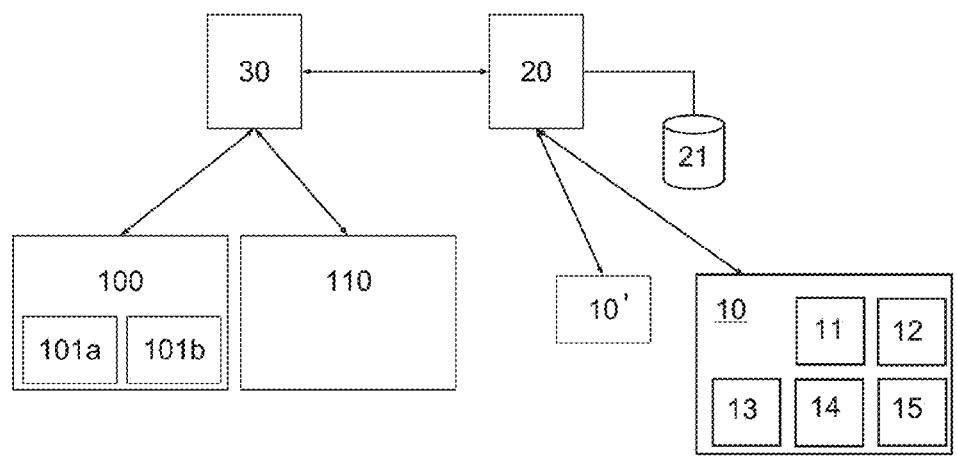
FIG. 3 is a view of a system for forwarding events to a plurality of vehicles, the system comprising an event management server with a management database.

FIG. 3 illustrates an embodiment of the system according to the invention for the management of events. The corresponding system includes a traffic control server 30 and an event management server 20, which are communicatively connected with one another.

The traffic control server 30 coordinates the traffic light systems 100, 110, 120, 130 and queries their status. For example, a communicative connection may exist between the traffic control server 30 and the individual controls of the traffic light systems 100, 110, 120, 130. The controls of the traffic light system 100, 110, 130 generally act in a self-sufficient manner. However, they inform the traffic control server of their states. In the case of a plurality of states, according to the invention, the traffic control server 30 can determine when the next change of state occurs (for example, the traffic light switches from green to red or from red to green). This becomes possible when the traffic control server 30 knows the control strategy of the controls of the traffic light systems 100, 110, 120, 130. As an alternative or in addition, the controls can inform the traffic control server concerning changes of state and dwell times. This may mean, for example, that the control of the first traffic light system 100 communicates a signal change (red→green) to the traffic control server 30 and informs the latter how long it will take until a new signal change will occur (green→red).

In an embodiment, the traffic control server 30 informs the event management server 20 of all these events. From this plurality of events, the event management server 20 filters out the information relevant to its clients, for example, the vehicles 10, 10' and forwards only the relevant information—events. In another embodiment, the traffic control server 30 has an interface, so that the event management server 20 can regularly acquire states, events, such as a change of state, and dwell times of individual signal groups 101a, 101b.

The event management server 20 includes a management database 21 with numerous tables for storing information. Furthermore, the event management server 20 is in a communicative connection with the vehicles 10, 10'. A corresponding communication connection can be established by way of an existing cellular network.

As mentioned above with respect to the vehicle 10, the vehicles 10, 10' may have an onboard power supply system 11 (FIG. 6). The navigation system 12 and the planning system 14 communicate with one another within this onboard power supply system 11. The planning system 14 can utilize a communication unit 13 in order to establish the communicative connection with the event management server 20.

In an embodiment, the planning system 14 receives data concerning the route 1 to be traveled as well as concrete position data of the vehicle 10 from the navigation system 12.

Figure 7:
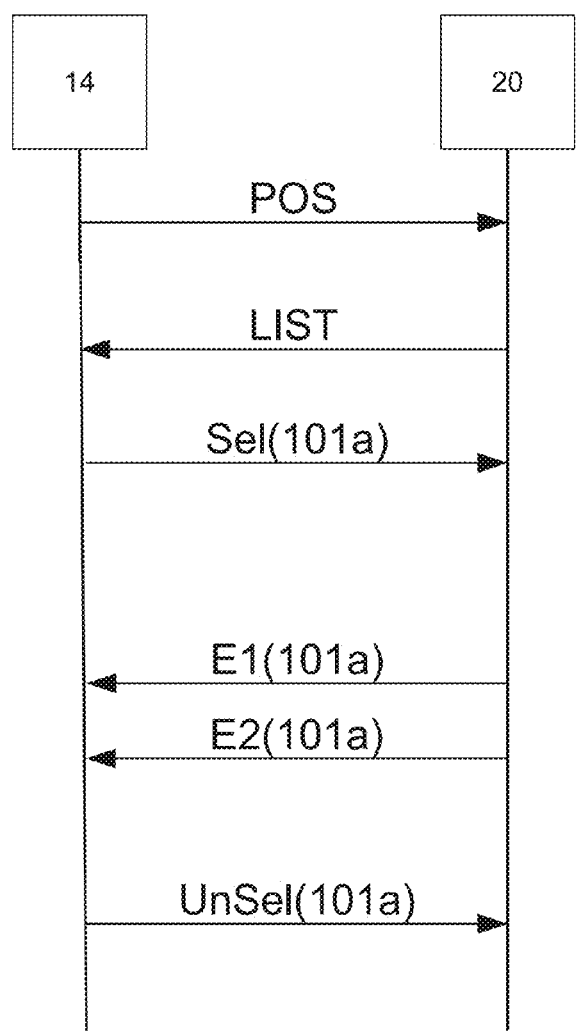
FIG. 7 is a view of an example of a communication between a planning system and the event management server of FIG. 3.

As illustrated in FIG. 7, the planning system 14 transmits the current position POS to the event management server 20 and thereby prompts the latter to transmit a list of traffic light systems 100, 110, 120, 130 and/or signal groups 101a, 101b situated in the proximity. Instead of position data, an identification of a defined city, a certain part of the city and/or of a street can also be transmitted. In response to this query, the event management server 20 will transmit a list of concerned devices, for example, with signal groups 101a, 101b. The list LIST can include an identification ID and position data for each device. The planning system 14 can compare these position data with the route 1 and select those signal groups 101a, 101b that are relevant to the traveling on the route 1.

Then the planning system 14 can subscribe to the individual devices. This can take place, for example, by way of the subscription message Sel (101*a*). In the case of the above-mentioned selection of devices, those signal groups 101*a*, 101*b* that are not situated on the route 1 may not be considered. Furthermore, the planning system 14 knows the traveling direction of the vehicle 10, so that signal groups 101*a*, 101*b* may also not be considered and are irrelevant if the traveling direction is defined. This can be explained as an example by means of FIG. 2. If it is assumed that the vehicle 10 approaches the traffic light system 100 from the southern direction, in the case of the given route 1, only the first signal group 101*a* is relevant but not the second signal group 101*b*. In this respect, the planning system 14 subscribes only to the first signal group 101*a*.

In an embodiment, the list LIST contains data concerning the alignment of the individual signal groups 101*a*, 101*b*, so that the planning system 14 can make this selection. In another embodiment, the list LIST contains only data concerning the traffic light systems 100, 110, 120, 130. Within the subscription message Sel(101*a*), the planning system 14 will then specify the direction in which the vehicle travels toward the respective traffic light system 100, 110, 120, 130. While taking into account the data concerning the traffic light system 100, 110, 120, 130 and the direction, the event management server 20 will then select a suitable signal group 101*a*, 101*b* by way of the subscription. After the processing of the subscription message Sel(101*a*), the event management server 20 will send out an event message E1, E2 always when an event occurs that relates to the subscribed device. In the embodiment explained in FIG. 7, the planning system 14 will receive first event message E1(101*a*), which indicates that the signal group 101*a* is changing from a red-light phase to a green-light phase. Later, the planning system 14 will receive a second event message E2(101*a*), which indicates that the signal group 101*a* is changing from the green phase to the red phase. The planning system 14 can use this information in order to inform a driver assistance system 15 (compare FIG. 6) that the vehicle 10 is traveling toward a red traffic light.

After passing or crossing through the first traffic light system 100, the planning system 14 will provide that the subscription of the first signal group 101*a* is terminated. For example, a corresponding message UnSel(101*a*) is transmitted to the event management server 20.

In a preferred embodiment, the event messages E1, E2 contain not only information concerning a change of state. In addition or instead, information concerning a future change of state or concerning a future event can be transmitted. For example, the first event message E1 may indicate that, at a future point in time, for example at 8:10 hours, the first signal group 101*a* will change from the green phase to the red phase. The second event message E2 can confirm that this change has actually taken place at 8:10 hours, and that a new change to the green phase should be expected at approximately 8:13 hours. This information can be processed by the planning system 14 and/or can be transmitted directly to the driver assistance system 15. The driver assistance system 15 can use the information in order to correspondingly adapt a traveling speed of the vehicle. Other application cases are contemplated.

Figure 4:
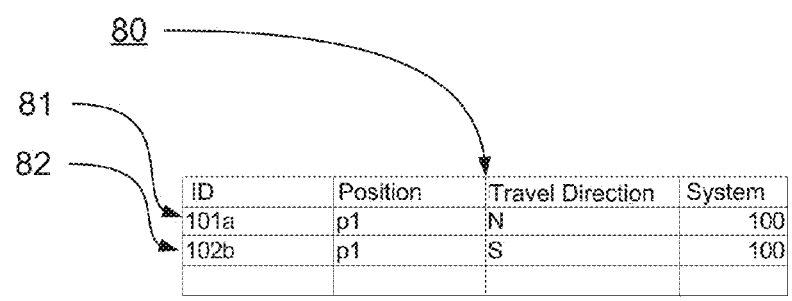
FIGS. 4 and 5 are views of tables from the management database according to FIG. 3.
Figure 5:
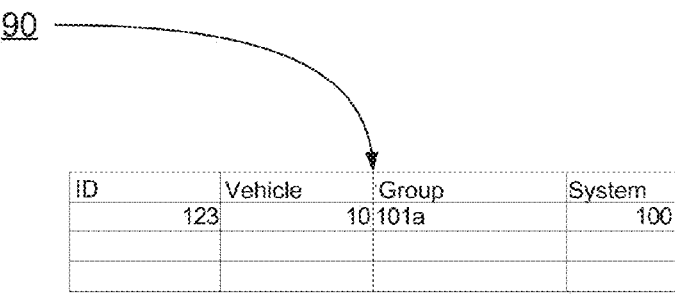

FIGS. 4 and 5 illustrate tables which are stored in the management database 21 of the event management server 20. FIG. 4 illustrates a signal group table 80 which, in an embodiment, contains all signal groups 101*a*, 101*b* of a defined region, for which the corresponding traffic control server 30 is responsible. The signal group table 80 can store an identification ID, a position ("position"), a starting direction ("traveling direction") and an assignment to a traffic light system ("system"). The signal group table 80 illustrated in FIG. 4 specifies two signal groups; here, consisting of the first signal group 101*a* and the second signal group 101*b*. The first line 81 relates to the first signal group 101*a* and the second line 82 relates to the second signal group 101*b*.

FIG. 5 contains a subscription table 90, which is necessary for managing subscriptions of the individual vehicles 10, 10'. The subscription table 90 contains an identification number ("ID"), which identifies the corresponding subscription. Data are also contained concerning the vehicle ("vehicle"), the concerned signal group ("group") as well as the concerned traffic light system ("system"). The subscription table 90 of FIG. 5 contains only one entry, which indicates that a subscription with the identification number 123 exists, according to which the vehicle 10 is to be informed concerning events of the signal group 101*a*. In addition, the subscription table 90 indicates that the signal group 101*a* is part of the traffic light system 100.

In the case of every event that is communicated by the traffic control server 30 to the event management server 20, the event management server 20 will therefore examine by means of the subscription table 90 which vehicle could be interested in this event. A communication with the corresponding vehicle 10, 10' will take place only if a corresponding entry exists in the subscription table 90. Otherwise, no event message E1, E2 is transmitted to the corresponding vehicle 10, 10'. This ensures that the available communication bandwidth will be utilized only for messages that are actually required. This can have the result that relevant information arrives significantly earlier at the recipient.

In the above-described embodiment, the navigation system 12, the communication unit 13, the planning system 14 and the driver assistance system 15 are separate components within the onboard power supply system 11. However, according to the invention, these components may be combined in one component. Furthermore, these components do not necessarily have to be part of an onboard power supply system 11 of a vehicle 10, 10'. The individual components may partly or entirely be implemented on a portable computer and/or a smartphone.

LIST OF REFERENCE SYMBOLS

| | |
|---|---|
| 1 | Route |
| 10, 10' | Vehicle |
| 11 | Onboard power supply system |
| 12 | Navigation system |
| 13 | Communication unit |
| 14 | Planning system |
| 15 | Driver assistance system |
| 20 | Event management server |
| 21 | Management database |
| 30 | Traffic control server |
| 80 | Signal group table |
| 81, 82 | First, second line |
| 100, 110, 120, 130 | Traffic light system |
| 101a, 101b | Signal group |
| 103, 103', 103'', 103''' | Signal transmitter(traffic light) |
| Pos | Current position |
| LIST | List |
| E1(101a), E2(101a) | Event message |
| Sel | Subscription message |
| UnSel | Unselection message |
| ID | Identification |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle, comprising:
   a communication unit that communicates with a vehicle external event management server that transmits event messages associated with a plurality of vehicle external devices;
   a navigation system that outputs at least one anticipated vehicle travel route, the navigation system including a memory that stores device identification data and device position data for each of the devices;
   a planning system that:
   a) retrieves a list of devices from the navigation system, the list associating each of the devices in the list with respective device identification and device position data;
   b) selects a device from the list based on whether a comparison of the route with the respective position data of devices on the list results in determining that the selected device intersects the route; and
   c) transmits a subscription message to the event management server initiating a subscription to receive from the event management server event messages associated with the selected device to the exclusion of event messages not associated with the selected device, the subscription message comprising the device identification data of the selected device.

2. The vehicle according to claim 1, wherein the plurality of devices are traffic light systems and/or signal groups of traffic light systems.

3. The vehicle to according to claim 1, wherein the planning system is further configured to:
   d) receive an event message from the event management server;
   e) process the event message and, based on the event message, predict a future event, which is assigned to the selected device; and
   f) communicate the future event and, if applicable, a point in time of the occurrence of the future event to a driver assistance system.

4. The vehicle according to claim 3, wherein the future event is a state of change of a device.

5. The vehicle according to claim 3, wherein:
   the driver assistance system comprises a cruise control system, and
   the cruise control system is designed to adapt a desired speed while taking into account the future event and/or the point in time of an occurrence of the future event.

6. The vehicle according to claim 1, wherein the planning system is further configured to:
   store a client subscription list identifying the selected device according to which the subscription message was sent;
   receive vehicle events with respect to a reached position and/or a new calculation of a route; and
   as a function of at least one vehicle event, send an unselection message to the event management server in order to terminate the subscription.

7. A system, comprising:
   a plurality of off-vehicle devices;
   a vehicle comprising: a communication unit, a navigation system that outputs at least one route, and a planning system configured to:
   a) retrieve a list of the devices, the list associating each of the devices with a respective device identification and device position,
   b) select a device from the list based on whether a comparison of the route with the respective position data for devices on the list results in determining that the selected device intersects the route, and
   c) transmit a subscription message including the device identification of the selected device and a network address identifying the vehicle; and
   an event management server communicatively coupled to the planning system via the communication unit, the event management server configured to:
   d) receive the subscription message from the planning system,
   e) associate the selected device identified by the device identification with the network address,
   f) acquire a plurality of events, each event associated with one or more of the plurality of devices, and
   g) send an event message to the network address, the event message corresponding only to events associated with the selected device identified by the device identification received in the subscription message.

8. The system according to claim 7, further comprising: storing the association between the device and the respective network address in a server subscription list.

9. The system according to claim 7, wherein the devices are traffic light systems, signal groups, and/or signal transmitters, each comprising a control, wherein the control is configured to, in an event of a current transition of state, determine a point in time of a future transition of state and communicate the current transition of state and the point in time of the future transition of state.

10. The system according to claim 9, wherein the future transition of state is an inverse of the current transition of state.

11. The system according to claim 9, further comprising a history database, in which a plurality of dwell time intervals for at least one device is stored, wherein the event management server is configured to determine a dwell time for the device in a defined state while taking into account the dwell time intervals.

12. The system according to claim 7, wherein the event message comprises data indicating a future event and an occurrence point in time.

13. A method for forwarding events to a plurality of vehicles, each vehicle comprising:
   a communication unit that communicates with an off-vehicle event management server;
   a navigation system that outputs at least one route;
   a planning system that:
   a) retrieves a list of devices, the list associating each device with a respective device identification and device position;
   b) selects a device from the list based on whether a comparison of the route with the respective position data of devices on the list results in determining that the selected device intersects the route; and
   c) subscribes to events associated with the selected device, to the exclusion of events not associated with the selected device, via sending a subscription message to the event management server, the subscription message comprising the device identification of the selected device, the method comprising the acts of:
- a) receiving the subscription message from at least one of the plurality of vehicles;
- b) assigning the device identification and a network address to the received subscription message;
- c) based on the subscription message, selecting the selected device identified by the device identification from among a plurality of devices;
- d) based on the subscription message, assigning the vehicle to the selected device;
- e) storing the assignment of the vehicle and the selected device;
- f) based on the stored assignment, forwarding an event message corresponding only to events associated with the selected device to the assigned vehicle.

14. The method according to claim 13, further comprising the act of:
- g) based on the stored assignment, forwarding data concerning a point in time of the occurrence of the future event to the assigned vehicle.

\* \* \* \* \*